US009538295B2

(12) United States Patent
Rasmussen

(10) Patent No.: US 9,538,295 B2
(45) Date of Patent: Jan. 3, 2017

(54) HEARING AID SPECIALIZED AS A SUPPLEMENT TO LIP READING

(71) Applicant: Oticon A/S, Smørum (DK)

(72) Inventor: Karsten Bo Rasmussen, Smørum (DK)

(73) Assignee: OTICON A/S, Smorum (DK)

( * ) Notice: Subject to any disclaimer, the term of this patent is extended or adjusted under 35 U.S.C. 154(b) by 59 days.

(21) Appl. No.: 14/469,137

(22) Filed: Aug. 26, 2014

(65) Prior Publication Data

US 2015/0098600 A1 Apr. 9, 2015

(30) Foreign Application Priority Data

Oct. 3, 2013 (EP) .................................... 13187235

(51) Int. Cl.
*H04R 25/00* (2006.01)
*G10L 15/00* (2013.01)
*G10L 21/00* (2013.01)

(52) U.S. Cl.
CPC .......... *H04R 25/353* (2013.01); *H04R 25/356* (2013.01); *H04R 25/402* (2013.01); *H04R 25/405* (2013.01); *H04R 25/552* (2013.01); *H04R 2225/41* (2013.01); *H04R 2225/43* (2013.01); *H04R 2225/61* (2013.01)

(58) Field of Classification Search
CPC .......... G10L 15/22; G10L 15/08; G10L 17/22; G10L 25/78; G10L 15/00; G10L 15/30; G10L 15/083; H04M 3/4936; H04R 2225/43; H04R 2225/41; H04R 25/353; H04R 25/356; H04R 2410/01
USPC ....... 381/23.1, 312, 317, 71.1; 704/231, 275
See application file for complete search history.

(56) References Cited

U.S. PATENT DOCUMENTS

| | | | | |
|---|---|---|---|---|
| 5,884,260 | A * | 3/1999 | Leonhard | 704/254 |
| 6,885,752 | B1 * | 4/2005 | Chabries et al. | 381/321 |
| 2003/0099370 | A1 * | 5/2003 | Moore | 381/312 |
| 2011/0243339 | A1 * | 10/2011 | Ang et al. | 381/23.1 |
| 2015/0063615 | A1 * | 3/2015 | Park et al. | 381/321 |

FOREIGN PATENT DOCUMENTS

WO WO 2011/015673 A2 2/2011

* cited by examiner

*Primary Examiner* — Paul S Kim
*Assistant Examiner* — Norman Yu
(74) *Attorney, Agent, or Firm* — Birch, Stewart, Kolasch & Birch, LLP

(57) ABSTRACT

A hearing aid is disclosed. The hearing aid comprises a microphone adapted to receive sound signals, an amplifier configured to amplify signals received by the microphone and output means (e.g. a receiver). The hearing aid is configured to detect if speech is received by the microphone and the hearing aid is configured to provide amplification of the detected sound signals according to a non-speech mode when no speech is detected. The hearing aid is configured to provide amplification of the detected sound signals according to a speech mode when speech is detected. The amplification carried out according to the non-speech mode is different from the amplification carried out according to the speech mode. The invention also discloses a method for amplifying sound signals received by a microphone in a hearing aid.

16 Claims, 6 Drawing Sheets

HEARING AID SPECIALIZED AS A SUPPLEMENT TO LIP READING

FIELD OF INVENTION

The present invention generally relates to a hearing aid. The present invention also relates to the fitting of hearing aids configured to be applied as a supplement to lip reading.

PRIOR ART

It is well known that hearing aid users generally either consciously or unconsciously exploit the potential in lip reading as a very important additional source of information for speech intelligibility. Moreover, for a significant portion of all hearing aid users the level of high frequency amplification suggested by standard fitting algorithms is perceive as being uncomfortable.

Hearing aids are typically fitted and optimised without taking lip reading into account. Further hearing aids are normally designed to work independently of lip reading.

Thus, there is need for a hearing aid that is configured to assist hearing aid users that use lip reading.

It is an object of the present invention to provide a hearing aid that is configured to provide a good assistance to the user of the hearing aid both when speech is present and when no speech is present.

It is also an object of the present invention to provide a method for amplifying sound signal (fitting a hearing aid) in a manner that provides the user of a hearing aid with improved communication skills.

SUMMARY OF THE INVENTION

The objects of the present invention can be achieved by a hearing aid as defined in claim 1 and by a method as defined in claim 8. Preferred embodiments are defined in the dependent sub claims and explained in the following description and illustrated in the accompanying drawings.

The hearing aid according to the invention is a hearing aid comprising a microphone adapted to receive sound signals, an amplifier configured to amplify signals received by the microphone and output means (e.g. a receiver). The hearing aid is configured to detect if speech is received by the microphone, where the hearing aid is configured to provide amplification of the detected sound signals according to a non-speech mode when no speech is detected, where the hearing aid is configured to provide amplification of the detected sound signals according to a speech mode when speech is detected, where the amplification carried out according to the non-speech mode is different from the amplification carried out according to the speech mode.

Hereby it is achieved that the hearing aid provides an improved hearing experience for the user in situations in which lip reading is carried out. The hearing aid provides good assistance to the user of the hearing aid both when speech is present and when no speech is present.

The hearing aid may be any suitable type of hearing aid. The hearing aid may comprise a single microphone or several microphones of any suitable type.

The amplifier may be any suitable type of amplifier configured to amplify signals received by the microphone(s).

The output means may be any suitable type of output means e.g. a receiver feeding sound into the ear or an electrode feeding electrical stimuli to nerves of the auditory system or a vibrator feeding vibrations to bone or soft tissue.

The hearing aid is configured to detect if speech is received by the microphone (s). This may be done in various ways, e.g. by using a signal processor that receives inputs from the microphone(s). Hereby the speech detection function may be integrated in standard hearing aid devices.

By providing a different amplification of the detected sound signals depending on whether or not speech is detected it is possible to take advantage of the fact that lip reading to some extent can compensate for hearing loss so that the gain in critical frequency ranges can be reduced.

It may be beneficial that the microphone is a directional microphone and that the hearing aid is configured to detect if speech is transmitted from a sound source in the frontal hemisphere as seen from the wearer and user of the hearing aid.

Hereby it is achieved that the hearing aid can determine if speech originates from a sound source positioned in the frontal hemisphere. When speech is transmitted from a sound source located in the frontal hemisphere, it is possible for the user of the hearing aid to see the speaking person and hereby take advantage of the possibility of lip reading.

It may be an advantage that the hearing aid comprises means for determining the distance from the hearing aid to the sound source so that the hearing aid device can be operated in the non-speech mode if speech is transmitted from a sound source that is located in the frontal hemisphere in a distance to the sound source that exceeds a predefined level, e.g. 20 m, since for practical reasons it may be difficult to carry out lip reading in large distances such as distances above 20 m.

It may be beneficial that the gain, in the speech mode, in at least one frequency range (e.g. in for frequencies above 1.8 kHz) is reduced according to a predefined gain reduction when compared to the gain in the non-speech mode.

Hereby it is possible to reduce the gain of a predefined frequency range in order to assist the user of the hearing aid in an improved manner.

It may be advantageous that the gain, in the speech mode, in a frequency range above 2 kHz is reduced according to a predefined gain reduction when compared to the gain in the non-speech mode. Taking into account the acoustic energy of the vowels and the consonants in human speech, it may be beneficial to reduce the gain for frequencies above 2 kHz.

It may be an advantage that the predefined gain reduction is within the range 5-40 dB, preferable within the range 10-30 dB such as 20 dB.

It may be beneficial that the hearing aid is configured to reduce the gain only when speech is detected in both a right hearing aid unit and in a corresponding left hearing aid unit.

Hereby it is achieved that the gain is reduced only when the sound source is located in a position, from which it is possible to hear the transmitted sound waves. In such position it should be possible for the user of the hearing aid to compensate for the gain reduction by applying lip reading. By applying a limited high frequency gain when a voice signal (speech) is detected in both hearing aid units only, and by applying conventional gain according to the audiogram otherwise, it is possible to allow the user to hear environmental sounds clearly and emphasizing only voices that are clearly above background noise.

It may be an advantage that the hearing aid comprises means for filtering away low frequencies preferably frequencies below 300 Hz, where the means for filtering away low frequencies is third- and higher-order filter.

Usually the very low frequency sounds, typically below 2-300 Hz, are filtered away by means of a first or second order filter in order to avoid disturbance from noises such a footsteps and wind induced noise. The first or second order filter is applied in order to secure the best sound quality, however, when lip reading is applied, the requirements are changed and thus the filter order can be increased. The increased filter order will limit the psychoacoustic masking effect, i.e. mid frequency sounds becoming unnoticeable due to the presence of low frequency sounds.

The method according to the invention is a method for amplifying sound signals received by a microphone in a hearing aid, which method comprises the step of detecting if speech is received by the microphone of a hearing aid, where the amplification of the detected sound signals is carried out according to a non-speech mode when no speech is detected and where the amplification of the detected sound signals is carried out according to a speech mode when speech is detected, where the amplification carried out according to the non-speech mode is different from the amplification carried out according to the speech mode.

Hereby it is achieved that the method can be used to amplify sound signals in a manner that provides the user of a hearing aid with improved hearing conditions.

It may be an advantage that the method comprises the step of determining if speech is transmitted from a sound source in the frontal hemisphere as seen from the user of the hearing aid wearing the hearing aid.

Hereby it is possible to perform an amplification that depends on whether or not a speech source is within the visible region (the frontal hemisphere) of the user of the hearing aid so that the amplification depends on whether or not the user of the hearing aid is capable of performing lip reading.

It may be beneficial that the amplification, in the speech mode, in at least one frequency range is reduced according to a predefined gain reduction when compared to the amplification in the non-speech mode.

Hereby it is possible to reduce the gain of a predefined frequency range in order to assist the user of the hearing aid to achieve an improved hearing experience.

It may be advantageous that the amplification, in the speech mode, in a frequency range above 2 kHz is reduced according to a predefined gain reduction when compared to the amplification in the non-speech mode.

It may be beneficial that the predefined gain reduction is within the range 5-40 dB, preferable within the range 10-30 dB such as 20 dB.

It may be an advantage that the amplification is reduced only when speech is detected in both a right hearing aid and a left hearing aid.

Accordingly, the gain is only reduced when the sound source is located in a position from which it is possible to hear the transmitted sound waves. It is possible for the user of the hearing aid to compensate for the gain reduction by applying lip reading. By applying a limited high frequency gain when a voice signal is detected in both hearing aids (both left and right) only, and by applying conventional gain according to the audiogram otherwise, will allow the user to hear environmental sounds clearly and emphasizing only voices that are clearly above background noise.

It may be beneficial that the method includes the step of filtering away low frequencies preferably frequencies below 300 Hz, by using a third- and higher-order filter.

When lip reading is applied the filter order can be increased so that the psychoacoustic masking effect is increased.

Generally large frequency bandwidth is challenging for the anti-feedback system since the feedback path changes more with time for high frequencies than for low frequencies and since even small changes in the surroundings of the hearing aid influence the high frequency feedback. Therefore, the present invention, by limiting the bandwidth, will have a positive effect on the performance at mid-frequencies in a wideband system.

The underlying assumption is that for persons with a pronounced hearing loss, there is focus on speech intelligibility of speakers which are clearly visible. The present invention is considered to have particularly relevance for users with an average hearing loss on the better ear of e.g. 60 dB or more. Based on an assumed hearing loss of 60 dB the level of prescribed insertion gain will be 30 dB or more according to the half gain rule. Different fitting algorithm or fitting rationale, such as NAL-NL1 and DSL-i/o lead to different prescribed responses, however, half gain considerations can be used to illustrate the concept of the present invention.

Taking a gain reduction in the order of 20 dB as a starting point, a flat hearing loss of 70 dB would lead to an insertion gain of 35 dB according to the half gain rule, which would then be reduced to 15 dB according to a 20 dB reduction for frequencies above e.g. 4 kHz. The remaining amplification for frequencies above 4 kHz should ensure a basic awareness of non-speech sounds from the surroundings but the level of amplification will need to be individually considered according to the nature of the hearing loss, cognitive skills and personal preferences.

In hearing aid fitting one can think of having a “loudness budget” in the sense that applying more gain in one particular frequency range will leave less loudness (and hence gain) available for other frequency regions. This is a reasoning based on psycho acoustics and perceived sound level and pointing towards advantages of a clear prioritization of amplification levels in different frequency regions.

There are technical reasons pointing in the same directions: Acoustic feedback may cause howling in the hearing aid and this risk is intimately related to the level of gain in general as well as in different frequency regions. Hence, the feedback cancellation systems in modern hearing aids are more efficient if the hearing instrument is close to the feedback limit in a limited frequency region only. Furthermore, the transducer system can become more energy efficient if the mid frequencies (e.g. 500 Hz to 4 kHz) are prioritized at the expense of lower and higher frequencies.

In the present context, a “hearing aid” refers to a device, such as e.g. a hearing device, a listening device or an active ear-protection device, which is adapted to improve, augment and/or protect the hearing capability of a user by receiving acoustic signals from the user’s surroundings, generating corresponding audio signals, possibly modifying the audio signals and providing the possibly modified audio signals as audible signals to at least one of the user’s ears.

A “hearing aid” further refers to a device such as an earphone or a headset adapted to receive audio signals electronically, possibly modifying the audio signals and providing the possibly modified audio signals as audible signals to at least one of the user’s ears. Such audible signals may e.g. be provided in the form of acoustic signals radiated into the user’s outer ears, acoustic signals transferred as mechanical vibrations to the user’s inner ears through the bone structure of the user’s head and/or through parts of the middle ear as well as electric signals transferred directly or indirectly to the cochlear nerve and/or to the auditory cortex of the user.

A hearing aid may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing aid may comprise a single unit or several units communicating electronically with each other.

More generally, a hearing aid comprises an input transducer for receiving an acoustic signal from a user's surroundings and providing a corresponding input audio signal and/or a receiver for electronically receiving an input audio signal, a signal processing circuit for processing the input audio signal and an output means for providing an audible signal to the user in dependence on the processed audio signal. Some hearing aids may comprise multiple input transducers, e.g. for providing direction-dependent audio signal processing. In some hearing aids, the receiver may be a wireless receiver. In some hearing aids, the receiver may be e.g. an input amplifier for receiving a wired signal. In some hearing aids, an amplifier may constitute the signal processing circuit.

In some hearing aids, the output means may comprise an output transducer, such as e.g. a loudspeaker for providing an air-borne acoustic signal or a vibrator for providing a structure-borne or liquid-borne acoustic signal.

In some hearing aids, the output means may comprise one or more output electrodes for providing electric signals.

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal in the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves and/or to the auditory cortex.

A hearing aid may refer to a system comprising one or two hearing aid units that may be adapted to cooperatively provide audible signals to both of the user's ears. Hearing aids may further comprise "auxiliary devices", which communicate with the hearing aid units and affect and/or benefit from the function of the hearing aid. Auxiliary devices may be e.g. remote controls, remote microphones, audio gateway devices, mobile phones, public-address systems, car audio systems or music players. Hearing aids may e.g. be used for compensating for a hearing-impaired person's loss of hearing capability; augmenting or protecting a normal-hearing person's hearing capability and/or conveying electronic audio signals to a person.

DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 1 *b*) shows a frequency-gain curve of a hearing aid according to the invention operated in a non-speech mode;

FIG. 1 *c*) shows a perspective view of a user of a hearing aid and a speaking person;

FIG. 1 *d*) shows a frequency-gain curve of a hearing aid according to the invention operated in a speech mode;

FIG. 2 *b*) shows a top view of a hearing aid user and a person speaking to the user from the back side of the user;

FIG. 2 *c*) shows a top view of a hearing aid user and a silent person in front of the user;

DETAILED DESCRIPTION OF THE INVENTION

Figure 1:
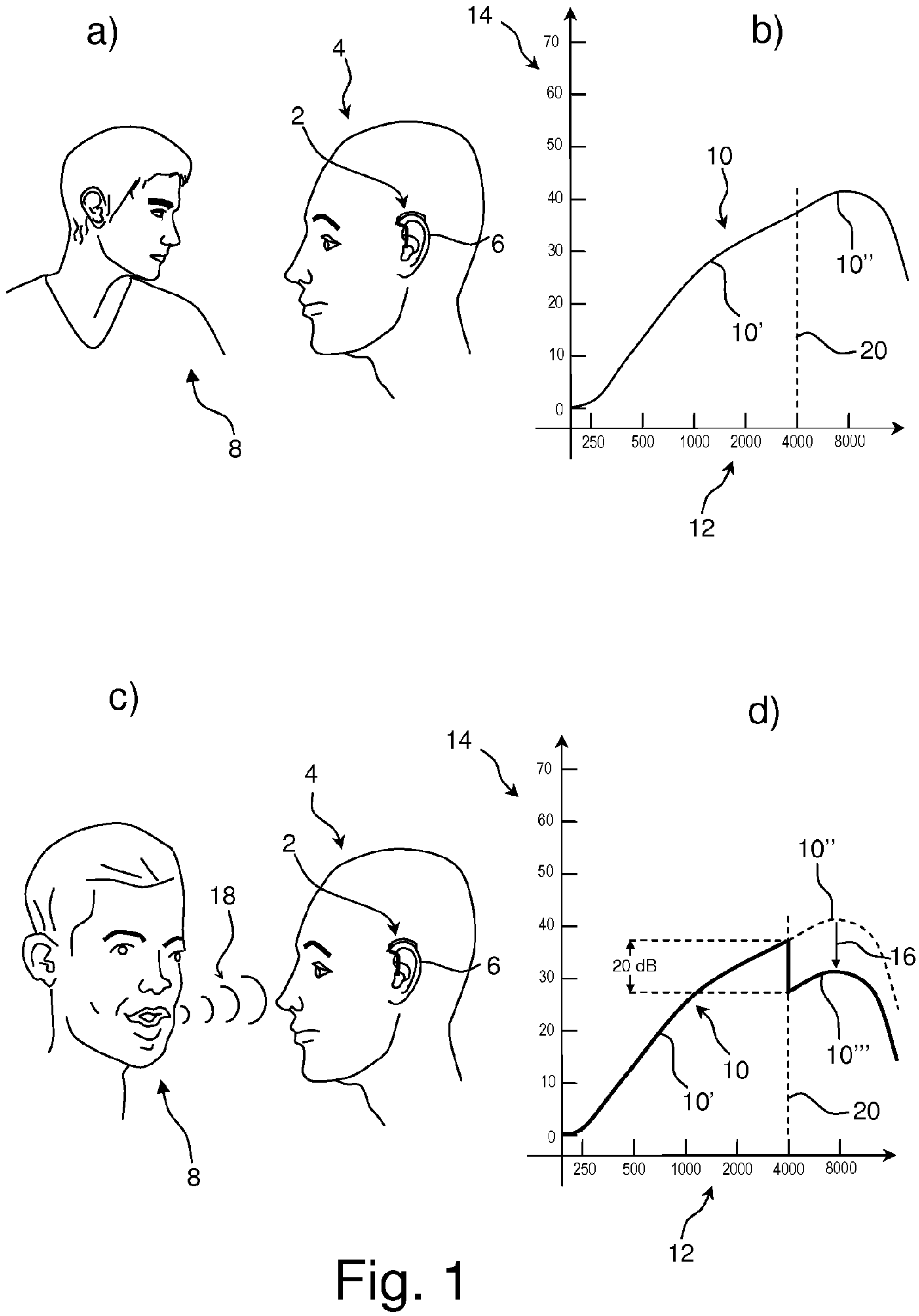
FIG. 1 *a*) shows a perspective view of a user of a hearing aid and a silent person.

Referring now in detail to the drawings for the purpose of illustrating preferred embodiments of the present invention, different views of hearing aids 2 according to the invention and corresponding frequency-gain curves are illustrated in FIG. 1.

FIG. 1 *a*) illustrates a perspective view of a hearing aid user 4 wearing a behind the ear (BTE) hearing aid 2. A silent person 8 is standing in front of the hearing aid user 4. The BTE hearing aid 2 is attached behind the ear 6 of the hearing aid user 4.

FIG. 1 *b*) illustrates a frequency-gain curve 10 of the BTE hearing aid 2 shown in FIG. 1 *a*) while the BTE hearing aid 2 is operated in a non-speech mode. The frequency-gain curve 10 depicts the gain 14 as function of the frequency 12 of the sound waves detected by the microphone of the BTE hearing aid 2. The frequency-gain curve 10 has a positive slope in the frequency band from 0 Hz to 8 kHz and a negative slope in the frequency band above 8 kHz.

A first curve section 10' and a second curve section 10" are indicated in the curve 10. The two curve sections 10', 10" extend at each side of a frequency limit 20 (indicated with a dashed line) provided at 4 kHz.

FIG. 1 *c*) illustrates a perspective view of a hearing aid user 4 wearing a BTE hearing aid 2. A person 8 is standing in front of the hearing aid user 4 and is speaking to the hearing aid user 4. The sound waves 18 originate from the speech.

FIG. 1 *d*) illustrates a frequency-gain curve 10 of the BTE hearing aid 2 shown in FIG. 1 *c*) while the BTE hearing aid 2 is operated in a speech mode. The frequency-gain curve 10 shows gain 14 versus frequency 12.

The frequency-gain curve 10 has a first curve section 10' (for frequencies 12 below the frequency limit 20 at 4 kHz) and a second curve section 10''' (for frequencies 12 above the frequency limit 20). The first curve section 10' is similar to the first curve section 10' shown in FIG. 1 *b*). This means that for frequencies below 4 kHz the hearing aid 4 applies the same gain settings and for low frequencies there will be no difference for the user 4 of the hearing aid 2.

However, at frequencies above the frequency limit 20 at 4 kHz the gain is reduced with gain reduction 16 of 20 dB when compared to the frequency-gain curve 10 shown in FIG. 1 *b*). The frequency limit 20 may be provided at other frequencies e.g. at 3 or 2 kHz. The second curve section 10" of the frequency-gain curve 10 shown in FIG. 1 *b*) is indicated with a dashed line by comparison.

Since a large frequency bandwidth is challenging for the anti-feedback system the gain reduction may have a positive influence on the anti-feedback system of the hearing aid 2, due to the fact that the feedback path changes more with time for high frequencies 12 than for low frequencies 12. Even small changes in the surroundings of the hearing aid 2 influence the high frequency feedback. Accordingly, limiting the bandwidth has a positive effect on the performance at mid-frequencies.

Since the user 4 of the hearing aid 2 is capable of performing lip reading (due to the position and orientation of the person 8 relative to user 4 of the hearing aid 2) the audiological need for high frequency amplification is severely reduced. Thus, the hearing aid 2 still provides the user 4 with a sufficient output signal even when a gain reduction 16 of e.g. 20 dB is applied for high frequencies.

It is important to note that the shown frequency-gain curve 10 is merely one example of a frequency-gain curve 10. The frequency-gain curve 10 may have various shapes and may depend on one or more detected, measured or calculated parameter in order to meet individual user specific demands.

Figure 2:
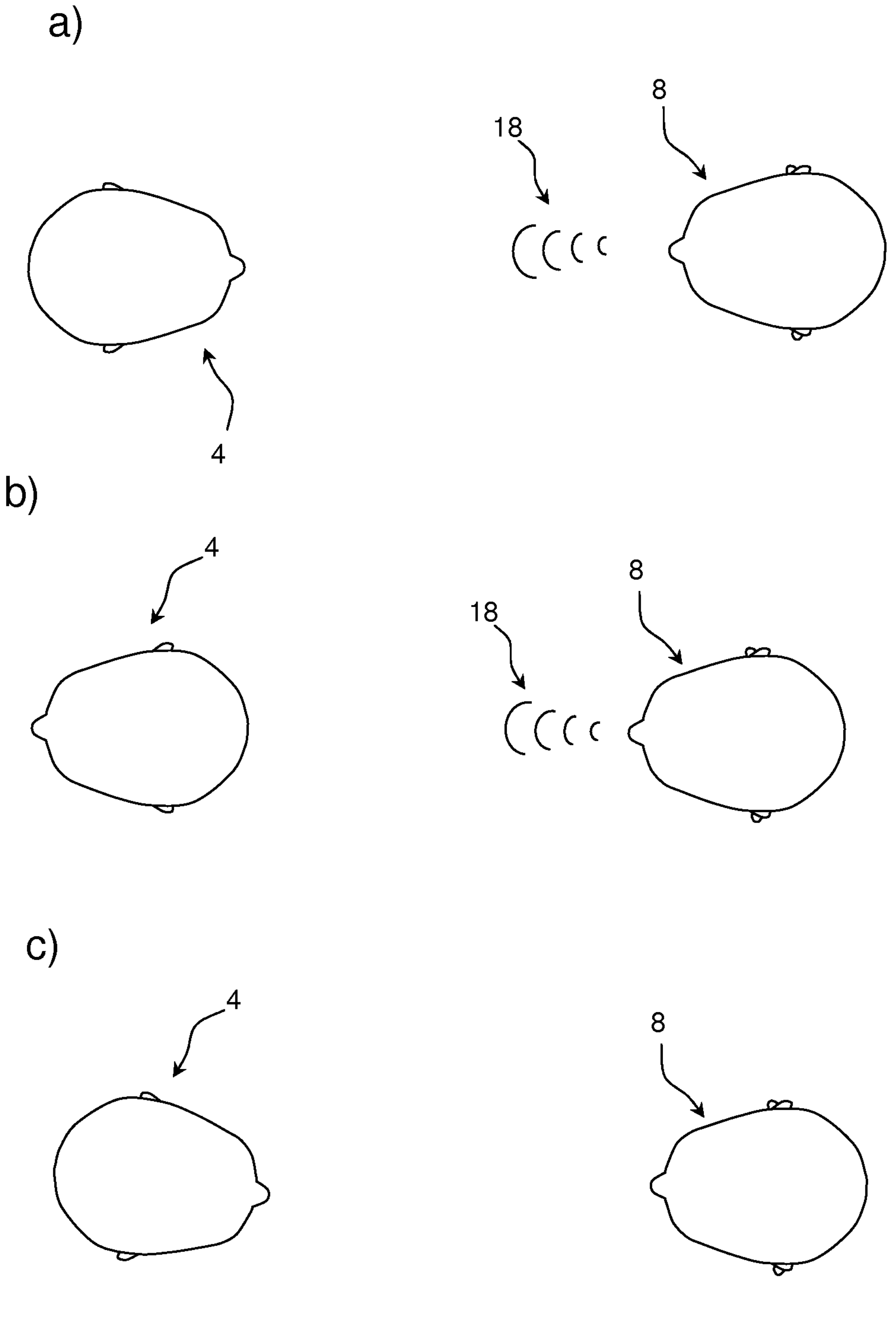
FIG. 2 *a*) shows a top view of a hearing aid user and a speaking person in front of the user.

FIG. 2 *a*) illustrates a top view of a hearing aid user 4 and a speaking person 8 standing in front of the user 4. The speech is indicated as sound waves 18. The situation shown in FIG. 2 *a*) is a speech mode corresponding to the situation illustrated in FIG. 2 *c*) where non-speech mode is illustrated.

It is preferred that the hearing aid 2 comprises means for detecting when the sound waves 18 are speech transmitted from a sound source in the frontal hemisphere (with respect to the user 4).

FIG. 2 *b*) illustrates a top view of a hearing aid user 4 and a speaking person 8 standing behind the user 4. The speech is indicated as sound waves 18.

If the hearing aid 2 comprises means for detecting when sound waves 18 in forms of speech is transmitted from a sound source in the frontal hemisphere, no gain reduction will occur in the situation illustrated in FIG. 2*b*, since the speech sounds 18 from person 8 are detected as not originating from the frontal hemisphere.

FIG. 2 *c*) illustrates a top view of a hearing aid user 4 and a silent person 8 standing in front of the user 4. The situation shown in FIG. 2 *c*) is a non-speech mode opposed to the situation illustrated in FIG. 2 *a*).

The hearing aid 2 comprises means for detecting when the sound waves 18 are speech transmitted from a sound source in the frontal hemisphere. Since no speech is detected from the frontal hemisphere, no gain reduction 16 will be carried out in the situation illustrated in FIG. 2*c*.

The hearing aid 2 according to the invention may have means for detecting when speech is transmitted from a sound source in the frontal hemisphere; however, it is also possible the hearing aid 2 applies a gain reduction 20 at high frequencies (e.g. frequencies above 2, 3 or 4 kHz) as default. This limitation in gain when speech is not present in the frontal hemisphere may further increase the listening comfort of the user 4.

Figure 3:
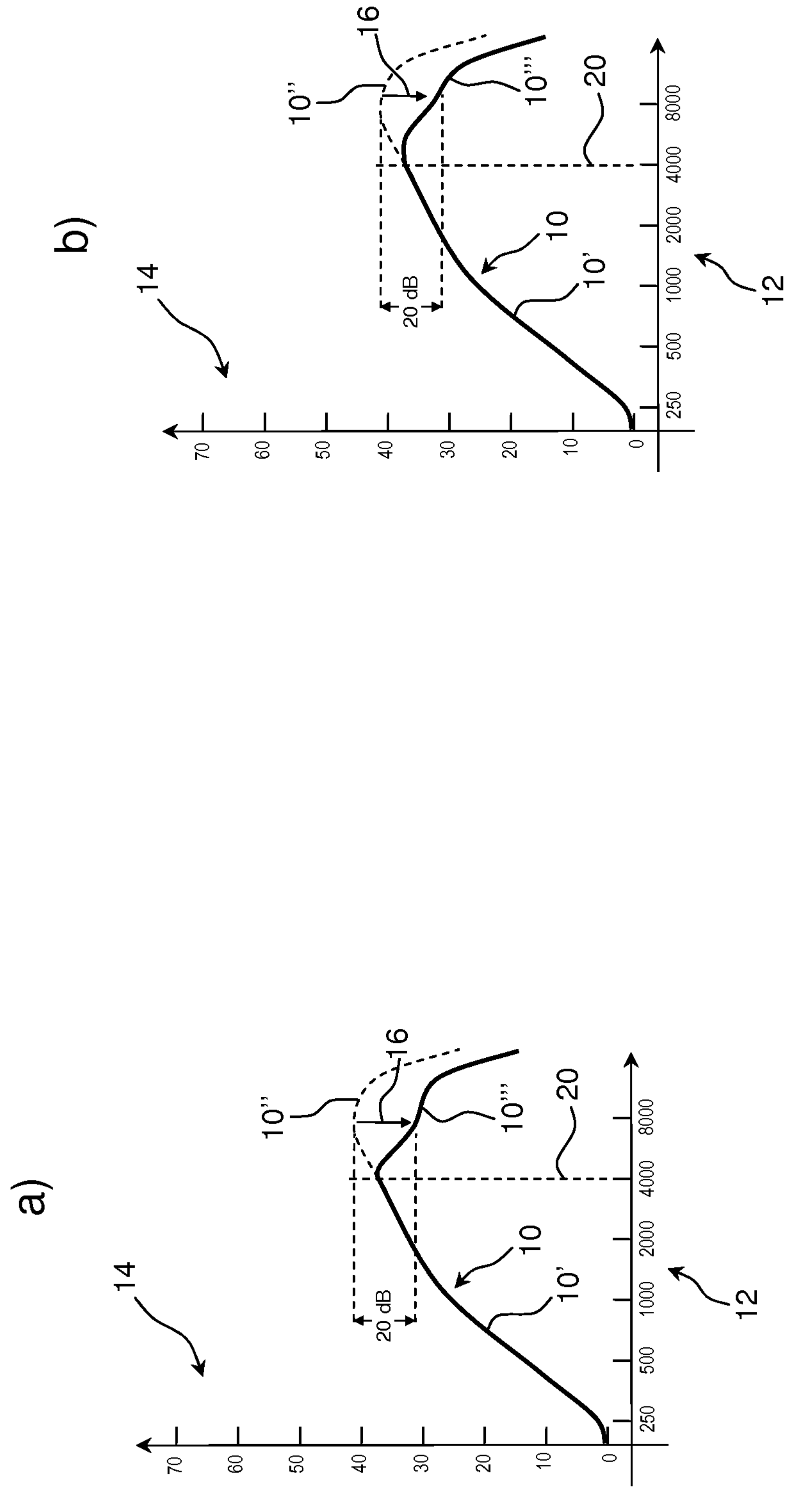
FIG. 3 shows two frequency-gain curves of hearing aids according to the invention.

FIG. 3 *a*) illustrates a frequency-gain curve 10 of a hearing aid 2 according to the invention. The frequency-gain curve 10 corresponds almost to the one shown in FIG. 1 *d*), however, the second curve section 10" is slightly changed. The second curve section 10'" is continuous and decreases gradually, whereas the second curve section 10'" shown in FIG. 1 *d*) is discontinuous due to the gain reduction 16 provided as a simple linear decrease by 20 dB. The second curve section 10" corresponding to FIG. 1 *b*) is indicated with a dashed line.

FIG. 3 *b*) illustrates another frequency-gain curve 10 of a hearing aid 2 according to the invention. The frequency-gain curve 10 is only slightly different from the frequency-gain curve 10 shown in FIG. 3 *a*). The second curve section 10'" decreases more slowly as function of frequency 12 than the corresponding second curve section 10'" shown in FIG. 3 *a*). The second curve section 10" corresponding to FIG. 1 *b*) is indicated with a dashed line.

Figure 4:
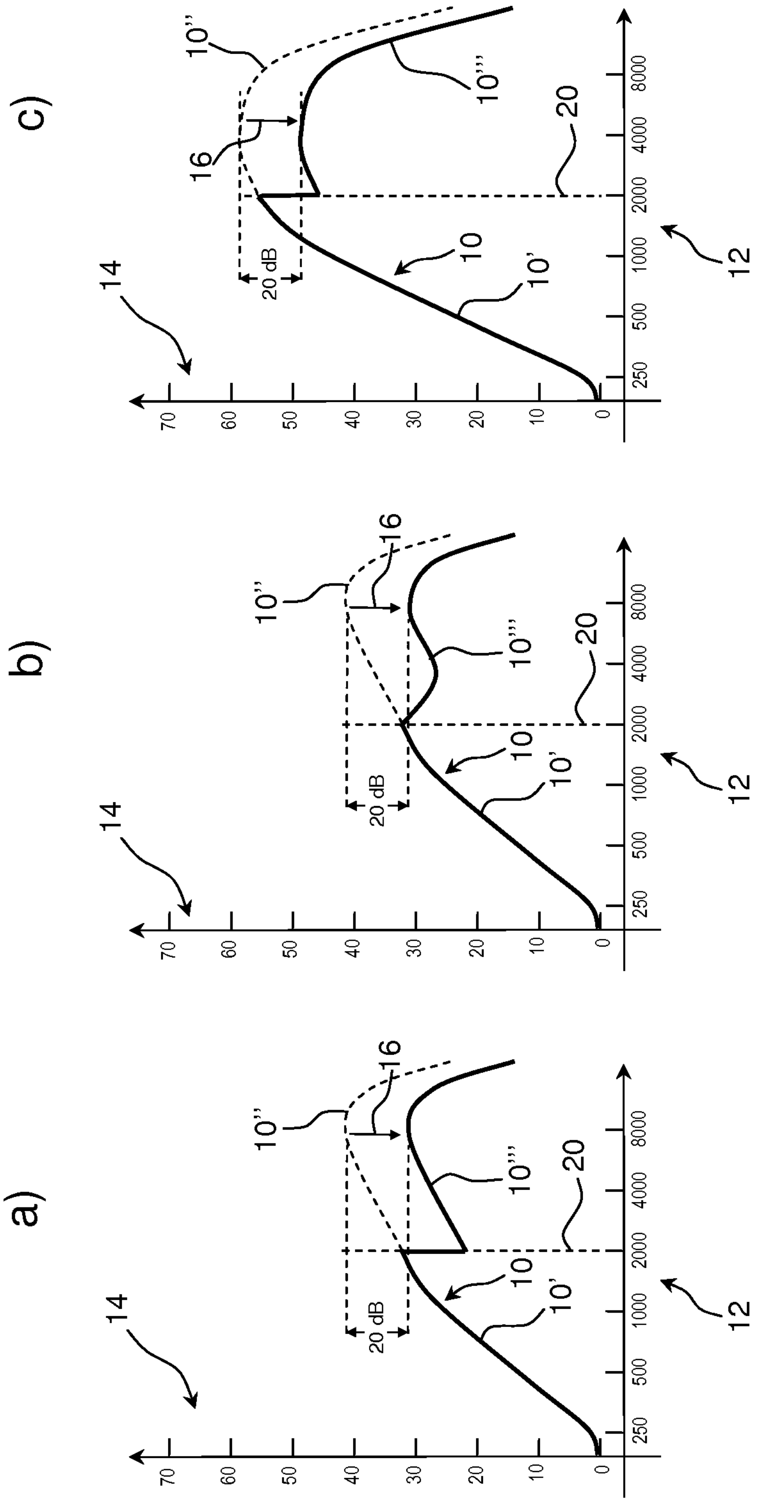
FIG. 4 shows three frequency-gain curves of hearing aids according to the invention.

FIG. 4 *a*) illustrates a frequency-gain curve 10 of a hearing aid 2 according to the invention. The frequency-gain curve 10 has a first curve section 10' showing the gain for frequencies from 0 Hz to 2 kHz and a second curve section 10'" showing the gain for frequencies above 2 kHz. The first curve section 10' and the remaining curve section 10" (indicated with a dashed line) of the frequency-gain curve 10 basically corresponds to the frequency-gain curve 10 shown in FIG. 1 *b*). The second curve section 10" of the frequency-gain curve 10 is, however, offset in such a manner that the gain is reduced with a gain reduction 16 of 20 dB. Thus, the frequency-gain curve 10 is discontinuous at the frequency limit 20 provided at 2 kHz.

FIG. 4 *b*) illustrates a frequency-gain curve 10 that generally speaking corresponds to the frequency-gain curve 10 shown in FIG. 4 *a*). The second curve section 10'" of the frequency-gain curve 10 is, however, gradually reduced from its starting point at about 32 dB to about 27 dB. The remaining portion of the second curve section 10'" of the frequency-gain curve 10 corresponds to the second curve section 10'" shown in FIG. 4 *a*).

FIG. 4 *c*) illustrates a frequency-gain curve 10 of a hearing aid 2 according to the invention. The frequency-gain curve 10 has a first curve section 10' showing the gain for frequencies from 0 Hz to 2 kHz and another curve section 10" (indicated with a dashed line) showing the gain for frequencies above 2 kHz when the hearing aid 2 is operated in a so-called non-speech mode. The frequency-gain curve 10 has a second curve section 10'" (indicated with a solid line) showing the gain for frequencies above 2 kHz when the hearing aid 2 is operated in a so-called speech mode.

When the curve section 10" indicated with a dashed line is compared with the second curve section 10" indicated with a solid line and showing the gain for frequencies above 2 kHz, it can be seen that the gain has been reduced by 20 dB (indicated with the gain reduction arrow 16).

The frequency-gain curve 10 is discontinuous at the frequency limit 20 provided at 2 kHz, when the hearing aid 2 is operated in the non-speech mode. On the other hand, the frequency-gain curve 10 is continuous at the frequency limit 20, when the hearing aid 2 is operated in the speech mode.

Figure 5:
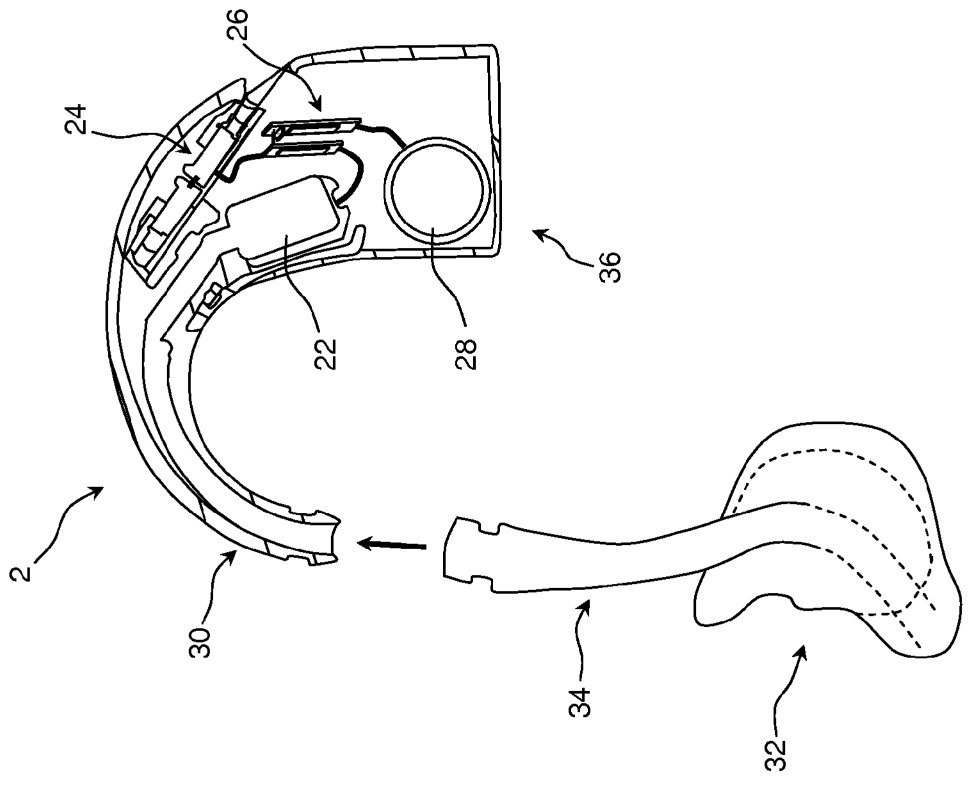
FIG. 5 shows a schematically view of a hearing aid according to the invention and FIG. 6 shows an in the ear hearing aid or RITE ear piece with schematically indicated electrical potential pick up points on the surface thereof.

FIG. 5 illustrates a schematically cross-sectional view of a hearing aid 2 according to the invention. The hearing aid 2 is a BTE hearing aid 2 provided with an ear mould 32 that is connected to the casing 36 of the hearing aid 2 by means of an ear hook 30 and sound tube connector 34.

The casing 36 comprises a battery 28 that is electrically connected to an amplifier 26. The amplifier 26 comprises a signal processor and is electrically connected to a microphone 24 and a receiver 22. The receiver 22 is configured to transmit an amplified sound signal via a hook 30 through the connector tube 34 to the ear mould 32, from where the sound may propagate towards the ear drum when the mould 32 is placed in the ear canal of the user of the hearing aid 2.

The microphone 24 is configured to detect sound waves through a sound opening 38 provided in the casing 36.

In one embodiment of a hearing aid 2 according to the invention the sound processor is configured to apply different amplification modes, e.g. a speech and a non-speech mode. The speech mode may be applied when speech is detected from a sound source in the frontal hemisphere (seen from the user of the hearing aid). The non-speech mode may be applied when no speech is detected from the frontal hemisphere.

It is possibly to apply one or more microphones 24 (e.g. one directional microphone 24 with two sound inlets) as means for the position of a sound source relative to the user of the hearing aid 2. Any suitable technique may be used to determine the position of a sound source relative to the user of the hearing aid 2.

When the speech mode is applied, speech is detected from a sound source in the frontal hemisphere. Accordingly, a gain reduction (see FIG. 1, FIG. 3 or FIG. 4) is applied. Hereby the gain from the hearing aid 2 is reduced in the order of 20 dB relative to prescribed gain in the non-speech mode in all acoustic surroundings. This limitation in gain when speech is present in the frontal hemisphere may increase the listening comfort of the user of the hearing aid 2.

Figure 6:
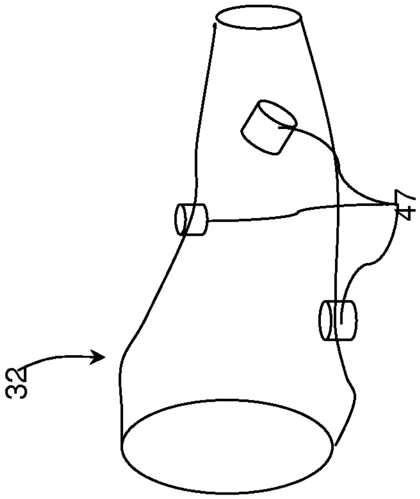

As seen in FIG. 6 the exterior of the casing or the mould 32 may comprise pick-up electrodes 47, allowing the hearing aid to sample EEG or other neuron or nerve induced signals from the users head or ear canal. Such signals are comprised of small electrical potential variations on the skin surface, and may be used to determine what activity the user is actually engaging in. Thus it may be determined that the user is trying to lip read, is not trying to lip read or is speaking. Thus EEG or similar brain wave signals may be used as an input in an automatic setting of amplification strategy for the hearing aid. Facial sensory and motor nerve pathways pass in close vicinity of the ear and ear canal, and EEG pick up electrodes when placed in the ear may thus also pick up activity in these neurons. This may be correlated as well to the EEG signal as to the microphone signals. If there is a correlation between microphone signals and the electric potential signals received from within or around the ear canal caused by neuron activity in the facial neuron bundles, this might be a strong indicator of vocalization by the wearer of the device also known as “own voice activity”. Surface potential signals caused by nerve bundles running close to the skin surface are likely to shift or fluctuate faster than brain waves, and thus in order to register actual sensory or motor nerve signals measuring frequencies need to be higher than for detecting EEG signals. However, such a correlation between microphone and nerve potential would constitute an own voice indicator in its own right, and such an own voice detector might be a handy element in many other circumstances, as many users prefer a different sound processing for own voice than for other sounds.

LIST OF REFERENCE NUMERALS

2 Hearing aid
4 User
6 Ear
8 Person
10 Curve
10', 10", 10'" Section of a curve
12 Frequency
14 Gain (dB)
16 Gain reduction
18 Sound wave
20 Frequency limit
22 Receiver
24 Microphone
26 Amplifier
28 Battery
30 Hook
32 Ear mould
34 Sound tube
36 Casing
38 Sound opening
47 EEG electrodes

The invention claimed is:

1. A hearing aid, comprising:
a directional microphone adapted to receive sound signals having a signal frequency range;
an amplifier configured to amplify signals received by the directional microphone; and
an output device, wherein
the hearing aid is configured to detect whether speech is received by the directional microphone and whether the speech is transmitted from a sound source different than a user of said hearing aid,
the hearing aid is further configured to provide amplification of the detected sound signals according to a non-speech mode when no speech from the sound source different than the user of said hearing aid is detected,
the hearing aid is further configured to provide amplification of the detected sound signals according to a speech mode when speech from the sound source different than the user of said hearing aid is detected, and
the amplification gain in a subset of the signal frequency range, the subset being narrower than the signal frequency range, carried out according to the speech mode is reduced according to a predefined gain reduction when compared to the amplification gain applied to said subset according to the non-speech mode.

2. The hearing aid according to claim 1, wherein
the hearing aid is configured to detect if speech is transmitted from a sound source in the frontal hemisphere as seen from the user of the hearing aid wearing the hearing aid.

3. The hearing aid according to claim 1, wherein
the subset is a frequency range above 2 kHz.

4. The hearing aid according to claim 3, wherein
the predefined gain reduction is within the range 5-40 dB.

5. The hearing aid according to claim 1, wherein
the hearing aid is configured to reduce the gain only when speech is detected in both a right side hearing aid and a left side hearing aid.

6. The hearing aid according to claim 1, further comprising:
a filter for filtering away frequencies below 300 Hz, wherein
the filter is a third- and higher-order filter.

7. A method for amplifying sound signals received by a microphone in a hearing aid, the method comprising:
receiving sound signals having a signal frequency range by the microphone;
determining a direction of arrival of the sound signals;
determining one or more frequencies of the sound signals;
detecting whether speech is received by the microphone;
detecting whether the speech is from a sound source different than a user of said hearing aid;
amplifying the sound signals according to a non-speech mode when no speech from the sound source different than the user of said hearing aid is detected; and amplifying the detected sound signals according to a speech mode when speech from the sound source different than the user of said hearing aid is detected, wherein the amplification carried out according to the speech mode applies a reduced gain in a subset of the signal frequency range, the subset being narrower than the signal frequency range, when compared to the gain of the amplification applied to said subset according to the non-speech mode.

8. The method according to claim 7, wherein the method comprises the step of determining if speech is transmitted from a sound source in the frontal hemisphere as seen from the user of the hearing aid wearing the hearing aid.

9. The method according to claim 7, wherein the subset is a frequency range above 2 kHz.

10. The method according to claim 9, wherein the predefined gain reduction is within the range 5-40 dB.

11. The method according to claim 7, wherein the amplification is reduced only when speech is detected in both a right side hearing aid and a left side hearing aid.

12. The method according to claim 7, further comprising:

filtering away frequencies below 300 Hz, by using a third- and higher-order filter.

13. The hearing aid according to claim 3, wherein the hearing aid is configured to reduce the gain only when speech is detected in both a right side hearing aid and a left side hearing aid.

14. The hearing aid according to claim 4, wherein the hearing aid is configured to reduce the gain only when speech is detected in both a right side hearing aid and a left side hearing aid.

15. The hearing aid according to claim 3, further comprising:

a filter for filtering away frequencies below 300 Hz, wherein the filter is a third- and higher-order filter.

16. The hearing aid according to claim 4, further comprising:

a filter for filtering away frequencies below 300 Hz, wherein the filter is a third- and higher-order filter.

* * * * *